United States Patent [19]
Minear et al.

[11] Patent Number: 5,983,350
[45] Date of Patent: *Nov. 9, 1999

[54] SECURE FIREWALL SUPPORTING DIFFERENT LEVELS OF AUTHENTICATION BASED ON ADDRESS OR ENCRYPTION STATUS

[75] Inventors: Spence Minear, Fridley; Edward B. Stockwell, St. Paul; Troy de Jongh, Bloomington, all of Minn.

[73] Assignee: Secure Computing Corporation, Roseville, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/715,343

[22] Filed: Sep. 18, 1996

[51] Int. Cl.$^6$ ...................................................... H04K 1/00
[52] U.S. Cl. ............................ 713/201; 380/49; 709/225; 709/249
[58] Field of Search ................................. 380/25, 42, 49; 395/187.01, 200.55, 200.6, 200.76, 200.79; 713/201; 709/225, 249

[56] References Cited

U.S. PATENT DOCUMENTS

| | | | |
|---|---|---|---|
| 3,956,615 | 5/1976 | Anderson et al. | 380/24 |
| 4,104,721 | 8/1978 | Markstein et al. | 711/164 |
| 4,177,510 | 12/1979 | Appell et al. | 711/163 |
| 4,442,484 | 4/1984 | Childs, Jr. et al. | 711/163 |
| 4,584,639 | 4/1986 | Hardy . | |

(List continued on next page.)

FOREIGN PATENT DOCUMENTS

| | | |
|---|---|---|
| 0 554 182 A1 | 4/1993 | European Pat. Off. . |
| 0 743 777 A2 | 11/1996 | European Pat. Off. . |
| 97/26734 | 7/1994 | WIPO . |
| 96/13113 | 5/1996 | WIPO . |
| 96/31035 | 10/1996 | WIPO . |
| 97/13340 | 4/1997 | WIPO . |
| 97/16911 | 5/1997 | WIPO . |
| 97/23972 | 7/1997 | WIPO . |
| 97/26731 | 7/1997 | WIPO . |
| 97/26735 | 7/1997 | WIPO . |
| 97/29413 | 8/1997 | WIPO . |

OTHER PUBLICATIONS

White, L.J., et al., "A Firewall Concept for Both Control-Flow and Data-Flow in Regression Integration Testing", *IEEE*, 262–271 (1992).

Merenbloom, P., "Network 'Fire Walls' Safeguard LAN Data from Outside Intrusion", *Infoworld*, p. 69 (Jul. 25, 1994).

Metzger, P., et al., "IP Authentication using Keyed MD5", RFC 1828, Piermont Information Services, Inc., New York, NY, http//ds.internic.net/rfc/rfc1828.txt, 6 p. (Aug. 1995).

Obraczka, K., et al., "Internet Resource Discovery Services", *Computer*, 26, 8–22 (Sep. 1993).

Press, L., "The Net: Progress and Opportunity", *Communications of the ACM*, 35, 21–25 (Dec. 1992).

Schroeder, M.D., et al., "A Hardware Architecture for Implementing Protection Rings", *Communications of the ACM*, 15, 157–170 (Mar. 1972).

(List continued on next page.)

*Primary Examiner*—Kenneth S. Kim
*Attorney, Agent, or Firm*—Schwegman, Lundberg, Woessner & Kluth, P.A.

[57] ABSTRACT

A system and method for regulating the flow of messages through a firewall having a network protocol stack, wherein the network protocol stack includes an Internet Protocol (IP) layer, the method comprising establishing a security policy, determining, at the IP layer, if a message is encrypted, if the message is not encrypted, passing the unencrypted message up the network protocol stack to an application level proxy, and if the message is encrypted, decrypting the message and passing the decrypted message up the network protocol stack to the application level proxy, wherein decrypting the message includes executing a process at the IP layer to decrypt the message.

16 Claims, 5 Drawing Sheets

U.S. PATENT DOCUMENTS

| | | |
|---|---|---|
| 4,621,321 | 11/1986 | Boebert et al. .............................. 707/8 |
| 4,648,031 | 3/1987 | Jenner et al. . |
| 4,701,840 | 10/1987 | Boebert et al. . |
| 4,713,753 | 12/1987 | Boebert et al. ......................... 711/164 |
| 4,870,571 | 9/1989 | Frink ....................................... 709/224 |
| 4,885,789 | 12/1989 | Burger et al. ............................. 382/25 |
| 5,093,914 | 3/1992 | Coplien et al. ......................... 395/704 |
| 5,124,984 | 6/1992 | Engel ...................................... 370/230 |
| 5,153,918 | 10/1992 | Tuai ......................................... 380/25 |
| 5,204,961 | 4/1993 | Barlow ....................................... 380/4 |
| 5,228,083 | 7/1993 | Lozowick et al. .......................... 380/9 |
| 5,263,147 | 11/1993 | Francisco et al. ...................... 711/164 |
| 5,272,754 | 12/1993 | Boebert ................................... 380/25 |
| 5,276,735 | 1/1994 | Boebert et al. ........................... 380/21 |
| 5,303,303 | 4/1994 | White ..................................... 380/49 |
| 5,305,385 | 4/1994 | Schanning et al. ....................... 380/49 |
| 5,311,593 | 5/1994 | Carmi ...................................... 380/23 |
| 5,329,623 | 7/1994 | Smith et al. ............................ 711/214 |
| 5,333,266 | 7/1994 | Boaz et al. .............................. 709/206 |
| 5,355,474 | 10/1994 | Thuraisngham et al. ................... 707/9 |
| 5,414,833 | 5/1995 | Hershey et al. ............................. 380/4 |
| 5,416,842 | 5/1995 | Aziz ........................................ 380/30 |
| 5,485,460 | 1/1996 | Schrier et al. .......................... 709/227 |
| 5,511,122 | 4/1996 | Atkinson ................................. 380/25 |
| 5,530,758 | 6/1996 | Marino, Jr. et al. ...................... 380/49 |
| 5,548,646 | 8/1996 | Aziz et al. ................................ 380/23 |
| 5,550,984 | 8/1996 | Gelb ....................................... 709/245 |
| 5,566,170 | 10/1996 | Bakke et al. ............................ 370/392 |
| 5,583,940 | 12/1996 | Vidrascu et al. .......................... 380/49 |
| 5,586,260 | 12/1996 | Hu .......................................... 395/500 |
| 5,604,490 | 2/1997 | Blakley, III et al. ............. 340/825.31 |
| 5,606,668 | 2/1997 | Shwed ...................................... 380/42 |
| 5,615,340 | 3/1997 | Dai et al. ................................ 709/250 |
| 5,619,648 | 4/1997 | Canale et al. ........................... 709/206 |
| 5,623,601 | 4/1997 | Vu ........................................... 713/202 |
| 5,636,371 | 6/1997 | Yu ........................................... 395/500 |
| 5,644,571 | 7/1997 | Seaman .................................. 370/401 |
| 5,671,279 | 9/1997 | Elgalmal et al. ......................... 380/23 |
| 5,673,322 | 9/1997 | Pepe et al. ............................... 380/49 |
| 5,684,951 | 11/1997 | Goldman et al. ........................... 707/9 |
| 5,689,566 | 11/1997 | Nguyen .................................... 380/25 |
| 5,699,513 | 12/1997 | Feigen et al. ........................... 713/200 |
| 5,706,507 | 1/1998 | Schloss .................................... 707/104 |
| 5,720,035 | 2/1998 | Allegre et al. .......................... 709/225 |
| 5,781,550 | 7/1998 | Templin et al. ......................... 370/401 |

OTHER PUBLICATIONS

Schwartz, M.F., "Internet Resource Discovery at the University of Colorado", *Computer,* 26, 25–35 (Sep. 1993).

Smith, R.E., "Sidewinder: Defense in Depth Using Type Enforcement", *International Journal of Network Management,* 219–229, (Jul.–Aug. 1995).

Thomsen, D., "Type Enforcement: The New Security Model", *Proceedings of the SPIE, Multimedia: Full–Service Impact on Business, Education and the Home,* vol. 2617, Philadelphia, PA, 143–150 (Oct. 23–24, 1995).

Warrier, U.S., et al., "A Platform for Heterogeneous Interconnection Network Management", *IEEE Journal on Selected Areas in Communications,* 8, 119–126 (Jan. 1990).

Wolfe, A, "Honeywell Builds Hardware for Computer Security", *Electronics,* 14–15 (Sep. 2, 1985).

Damashek, M., "Gauging Similarity with n–Grams: Language–Independent Categorization of Text", *Science,* 267, 843–848 (Feb. 10, 1995).

Dillaway, B.B., et al., "A Practical Design For A Multilevel Secure Database Management System", American Institute of Aeronautics and Astronautics, Inc., 44–57 (Dec. 1986).

Fine, T., et al., "Assuring Distributed Trusted Mach", *Proceedings of the IEEE Computer Society Symposium on Research in Security and Privacy,* 206–218 (1993).

Foltz, P.W., et al., "Personalized Information Delivery: An Analysis of Information Filtering Methods", *Communication of the ACM,* 35, 51–60 (Dec. 1992).

Goldberg, D., et al., "Using Collaborative Filtering to Weave an Information Tapestry", *Communications of the ACM,* 35, 61–70 (Dec. 1992).

Grampp, F.T., "UNIX Operating System Security", *AT&T Bell Laboratories Technical Journal,* 63, 1649–1672 (Oct. 1984).

Haigh, J.T., et al., "Extending the Non–Interference Version of MLS for SAT", Proceedings of the 1996 IEEE Symposium on Security and Privacy, Oakland, CA, 232–239 (Apr. 7–9, 1986).

Karn, P., et al., "The ESP DES–CBC Transform", RFC 1829, Qualcomm, Inc., San Diego, CA, http//ds.internic.net/rfc/rfc1829.txt, 11 p. (Aug. 1995).

Kent, S.T., "Internet Privacy Enhanced Mail", Communications of the ACM, 36, 48–60 (Apr. 1993).

Lampson, B.W., "Dynamic Protection Structures", AFIPS Conference Proceedings, vol. 35, 1969 Fall Joint Computer Conference, Las Vegas, NV, 27–38 (Nov. 18–20, 1969).

Lee, K.–C., et al., "A Framework for Controlling Cooperative Agents", *Computer,* 8–16 (Jul. 1993).

Loeb, S., "Architecting Personalized Delivery of Multimedia Information", *Communications of the ACM,* 35, 39–50 (Dec. 1992).

Loeb, S., et al., "Information Filtering," *Communications of the ACM,* 35, 26–28 (Dec. 1992).

PCT Search Report, Application No. PCT/US 95/12681, 8 p. (Apr. 4, 1996).

"Sidewinder Internals", Product Information, Secure Computing Corporation, 16 p. (Oct. 12, 1994).

"Special Report: Secure Computing Corporation and Network Security", *Computer Select,* 13 p. (Dec. 1995).

Cobb, S., "Establishing Firewall Policy", *IEEE,* 198–205 (1996).

Gassman, B., "Internet Security, and Firewalls Protection on the Internet", *IEEE,* 93–107 (1996).

Greenwald, M., et al., "Designing an Academic Firewall: Policy, Practice, and Experience with SURF", *IEEE,* 79–92 (1996).

McCarthy, S.P., "Hey Hackers! Secure Computing Says You Can't Break into This Telnet Site", *Computer Select,* 2 p. (Dec. 1995).

Peterson, L.L., et al., Computer Networks: A Systems Approach, Morgan Kaufmann Publishers, Inc., San Francisco, CA, pp. 218–221, 284–286 (1996).

Smith, R.E., "Constructing a High Assurance Mail Guard", Secure Computing Corporation (Appeared in the Proceedings of the National Computer Security Conference), 7 p. (1994).

Stempel, S., "IpAccess—An Internet Service Access System for Firewall Installations", *IEEE,* 31–41 (1995).

"SATAN No Threat to Sidewinder™", News Release, Secure Computing Corporation (Apr. 26, 1995).

"Answers to Frequently Asked Questions About Network Security", Secure Computing Corporation, 41 p. (1994).

Adam, J.A., "Meta–matrices", *IEEE Spectrum,* 26–27 (Oct. 1992).

Adam, J.A., "Playing on the Net", IEEE Spectrum, 29 (Oct. 1992).

Ancilotti, P., et al., "Language Features for Access Control", *IEEE Transactions on Software Engineering,* SE–9, 16–25 (Jan. 1983).

Atkinson, R., "IP Authentication Header", RFC 1826, Naval Research Laboratory, Washington, D.C., http/ds.internic.net/rfc/rfc1826.txt, 13 p. (Aug. 1995).

Atkinson, R., "IP Encapsulating Security Payload (ESP)", RFC 1827, Naval Research Laboratory, Washington, D.C., http//ds.internic.net/rfc/rfc1827.txt, 12 p. (Aug. 1995).

Atkinson, R., "Security Architecture for the Internet Protocol", RFC 1825, Naval Research Laboratory, Washington, D.C., http//ds.internic.net/rfc/rfc1825.txt, 21 p. (Aug. 1995).

Badger, L., et al., "Practical Domain and Type Enforcement for UNIX", Proceedings of the 1995 IEEE Symposium on Security and Privacy, Oakland, CA 66–77 (May 8–10, 1995).

Belkin, N.J., et al., "Information Filtering and Information Retrieval: Two Sides of the Same Coin?", *Communications of the ACM,* 35, 29–38 (Dec. 1992).

Bellovin, S.M., et al., "Network Firewalls", *IEEE Communications Magazine,* 32, 50–57 (Sep. 1994).

Bevier, W.R., et al., "Connection Policies and Controlled Interference", Proceedings of the 8th IEEE Computer Security Foundations Workshop, Kenmare, County Kerry, Ireland, 167–176 (Jun. 13–15, 1995).

Bowen, T.F., et al., "The Datacycle Architecture", *Communications of the ACM,* 35, 71–81 (Dec. 1992).

Bryan, J., "Firewalls For Sale", *BYTE,* pp. 99–100, 102 and 104 (Apr. 1995).

"100% of Hackers Failed to Break Into One Internet Site Protected by Sidewinder", News Release, Secure Computing Corporation (Feb. 16, 1995).

"Internet Security System Given 'Product of the Year' Award", News Release, Secure Computing Corporation, (Mar. 28, 1995).

SECURE FIREWALL SUPPORTING DIFFERENT LEVELS OF AUTHENTICATION BASED ON ADDRESS OR ENCRYPTION STATUS

BACKGROUND OF THE INVENTION

1. Field of the Invention

The present invention pertains generally to network communications, and in particular to a system and method for securely transferring information between firewalls over an unprotected network.

2. Background Information

Firewalls have become an increasingly important part of network design. Firewalls provide protection of valuable resources on a private network while allowing communication and access with systems located on an unprotected network such as the Internet. In addition, they operate to block attacks on a private network arriving from the unprotected network by providing a single connection with limited services. A well designed firewall limits the security problems of an Internet connection to a single firewall computer system. This allows an organization to focus their network security efforts on the definition of the security policy enforced by the firewall. An example of a firewall is given in "SYSTEM AND METHOD FOR PROVIDING SECURE INTERNETWORK SERVICES", U.S. patent application Ser. No. 08/322078, filed Oct. 12, 1994 by Boebert et al., now issued U.S. Pat. No. 5,864,683, the description of which is hereby incorporated by reference. A second example of such a system is described in "SYSTEM AND METHOD FOR ACHIEVING NETWORK SEPARATION", U.S. application Ser. No. 08/599,232, filed Feb. 9, 1996 by Gooderum et al., the description of which is hereby incorporated by reference. Both are examples of application level gateways. Application level gateways use proxies operating at the application layer to process traffic through the firewall. As such, they can review not only the message traffic but also message content. In addition, they provide authentication and identification services, access control and auditing.

Data to be transferred on unprotected networks like the Internet is susceptible to electronic eavesdropping and accidental (or deliberate) corruption. Although a firewall can protect data within a private network from attacks launched from the unprotected network, even that data is vulnerable to both eavesdropping and corruption when transferred from the private network to an external machine. To address this danger, the Internet Engineering Task Force (IETF) developed a standard for protecting data transferred between firewalls over an unprotected network. The Internet Protocol Security (IPSEC) standard calls for encrypting data before it leaves the first firewall, and then decrypting the data when it is received by the second firewall. The decrypted data is then delivered to its destination, usually a user workstation connected to the second firewall. For this reason IPSEC encryption is sometimes called firewall-to-firewall encryption (FFE) and the connection between a workstation connected to the first firewall and a client or server connected to the second firewall is termed a virtual private network, or VPN.

The two main components of IPSEC security are data encryption and sender authentication. Data encryption increases the cost and time required for the eavesdropping party to read the transmitted data. Sender authentication ensures that the destination system can verify whether or not the encrypted data was actually sent from the workstation that it was supposed to be sent from. The IPSEC standard defines an encapsulated payload (ESP) as the mechanism used to transfer encrypted data. The standard defines an authentication header (AH) as the mechanism for establishing the sending workstation's identity.

Through the proper use of encryption, the problems of eavesdropping and corruption can be avoided; in effect, a protected connection is established from the internal network connected to one firewall through to an internal network connected to the second firewall. In addition, IPSEC can be used to provide a protected connection to an external computing system such as a portable personal computer.

IPSEC encryption and decryption work within the IP layer of the network protocol stack. This means that all communication between two IP addresses will be protected because all interfirewall communication must go through the IP layer. Such an approach is preferable over encryption and decryption at higher levels in the network protocol stack since when encryption is performed at layers higher than the IP layer more work is required to ensure that all supported communication is properly protected. In addition, since IPSEC encryption is handled below the Transport layer, IPSEC can encrypt data sent by any application. IPSEC therefore becomes a transparent add-on to such protocols as TCP and UDP.

Since, however, IPSEC decryption occurs at the IP layer, it can be difficult to port IPSEC to an application level gateway while still maintaining control at the proxy over authentication, message content, access control and auditing. Although the IPSEC specification in RFC 1825 suggests the use of a mandatory access control mechanism in a multi-level secure (MLS) network to compare a security level associated with the message with the security level of the receiving process, such an approach provides only limited utility in an application level gateway environment. In fact, implementations on application level gateways to date have simply relied on the fact that the message was IPSEC-encrypted as assurance that the message is legitimate and have simply decoded and forwarded the message to its destination. This creates, however, a potential chink in the firewall by assuming that the encrypted communication has access to all services.

What is needed is a method of handling IPSEC messages within an application level gateway which overcomes the above deficiencies. The method should allow control over access by an IPSEC connection to individual services within the internal network..

SUMMARY OF THE INVENTION

The present invention is a system and method for regulating the flow of messages through a firewall having a network protocol stack, wherein the network protocol stack includes an Internet Protocol (IP) layer, the method comprising the steps of determining, at the IP layer, if a message is encrypted, if the message is not encrypted, passing the unencrypted message up the network protocol stack to an application level proxy, and if the message is encrypted, decrypting the message and passing the decrypted message up the network protocol stack to the application level proxy, wherein the step of decrypting the message includes the step of executing a procedure at the IP layer to decrypt the message.

According to another aspect of the present invention, a system and method is described for authenticating the sender of a message within a computer system having a network protocol stack, wherein the network protocol stack includes an Internet Protocol (UP) layer, the method comprising the steps of determining, at the IP layer, if the message is encrypted, if the message is encrypted, decrypting the message, wherein the step of decrypting the message includes the step of executing a procedure at the IP layer to decrypt the message, passing the decrypted message up the network protocol stack to an application level proxy, determining an authentication protocol appropriate for the message, and executing the authentication protocol to authenticate the sender of the message.

BRIEF DESCRIPTION OF THE DRAWINGS

In the drawings, where like numerals refer to like components throughout the several views.

DESCRIPTION OF THE PREFERRED EMBODIMENTS

In the following detailed description of the preferred embodiment, references made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that structural, logical, physical, architectural, and electrical changes may be made without departing from the spirit and scope of the present invention. The following detailed description is, therefore, not to be taken in a limiting sense, and the scope of the present invention is defined only by the appended claims and their equivalents.

Figure 1:
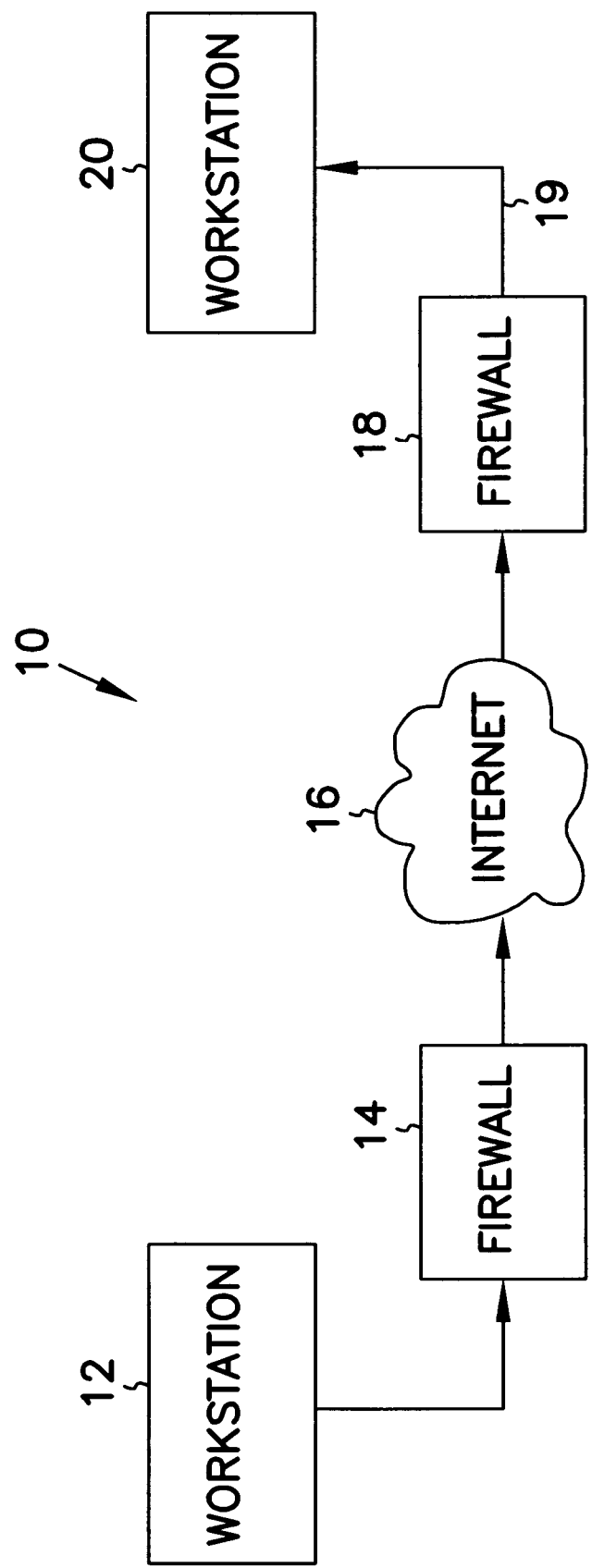
FIG. 1 is a functional block diagram of an application level gateway-implemented firewall-to-firewall encryption scheme according to the present invention.

A system 10 which can be used for firewall-to-firewall encryption (FFE) is shown in FIG. 1. In FIG. 1, system 10 includes a workstation 12 communicating through a firewall 14 to an unprotected network 16 such as the Internet. System 10 also includes a workstation 20 communicating through a firewall 18 to unprotected network 16. In one embodiment, firewall 18 is an application level gateway.

As noted above, IPSEC encryption and decryption work within the IP layer of the network protocol stack. This means that all communications between two IP addresses will be protected because all interfirewall communication must pass through the IP layer. IPSEC takes the standard Internet packet and converts it into a carrier packet. The carrier packet is designed to do two things: to conceal the contents of the original packet (encryption) and to provide a mechanism by which the receiving firewall can verify the source of the packet (authentication). In one embodiment of the present invention, each IPSEC carrier packet includes both an authentication header used to authenticate the sending machine and an encapsulated payload containing encrypted data. The authentication header and the encapsulated payload features of IPSEC can, however, be used independently. As required in RFC 1825, DES-CBC is provided for use in encrypting the encapsulated payload while the authentication header uses keyed MD5.

To use IPSEC, you must create a security association (SA) for each destination IP address. In one embodiment, each SA contains the following information:

Security Parameters Index (SPI)—The index used to find a SA on receipt of an IPSEC datagram.

Destination IP address—The address used to find the SA and trigger use of IPSEC processing on output.

The peer SPI—The SPI value to put on a IPSEC datagram on output.

The peer IP address—The destination IP address to be put into the packet header if IPSEC Tunnel mode is used.

The Encryption Security Payload (ESP) algorithm to be used.

The ESP key to used for decryption of input datagrams.

The ESP key to used for encryption of output datagrams.

The authentication (AH) algorithm to be used.

The AH key to be used for validation of input packets.

The AH key to be used for generation of the authentication data for output datagrams.

The combination of a given Security Parameter Index and Destination IP address uniquely identifies a particular "Security Association." In one embodiment, the sending firewall uses the sending userid and Destination Address to select an appropriate Security Association (and hence SPI value). The receiving firewall uses the combination of SPI value and Source address to obtain the appropriate Security Association.

A security association is normally one-way. An authenticated communications session between two firewalls will normally have two Security Parameter Indexes in use (one in each direction). The combination of a particular Security Parameter Index and a particular Destination Address uniquely identifies the Security Association.

More information on the specifics of an IPSEC FFE implementation can be obtained from the standards developed by the IPSEC work group and documented in *Security Architecture for IP* (RFC 1825) and in RFC's 1826–1829.

When a datagram is received from unprotected network 16 or is to be transmitted to a destination across unprotected network 16, the firewall must be able to determine the algorithms, keys, etc. that must be used to process the datagram correctly. In one embodiment, this information is obtained via a security association lookup. In one such embodiment, the lookup routine is passed several arguments: the source IP address if the datagram is being received from network 16 or the destination IP address if the datagram is to be transmitted across network 16, the SPI, and a flag that is used to indicate whether the lookup is being done to receive or transmit a datagram.

When an IPSEC datagram is received by firewall 18 from unprotected network 16, the SPI and source IP address are determined by looking in the datagram. In one embodiment a Security Association Database (SADB) stored within firewall 18 is searched for the entry with a matching SPI. In one such embodiment, security associations can be set up based on network address as well as a more granular host address. This allows the network administrator to create a security association between two firewalls with only a couple of lines in a configuration file on each machine. For such embodiments, the entry in the Security Association Database that has both the matching SPI and the longest address match is selected as the SA entry. In another such embodiment, each SA has a prefix length value associated with the address. An address match on a SA entry means that the addresses match for the number of bits specified by the prefix length value.

There are two exceptions to this search process. First, when an SA entry is set marked as being dynamic it implies that the user of this SA may not have a fixed IP address. In this case the match is fully determined by the SPI value. Thus it is necessary that the SPI values for such SA entries be unique in the SADB. The second exception is for SA entries marked as tunnel mode entries. In this case it is normally the case that the sending entity will hide its source address so that all that is visible on the public wire is the destination address. In this case, like in the case where the SA entries are for dynamic IP addresses, the search is done exclusively on the basis of the SPI.

When transmitting a datagram across unprotected network 16 the SADB is searched using only the destination address as an input. In this case the entry which has the longest address match is selected and returned to the calling routine.

In one embodiment, if firewall 18 receives datagrams which are identified as either an IP_PROTO_IPSEC_ESP or IP_PROTO_IPSEC_AH protocol datagram, there must be a corresponding SA in the SADB or else firewall 18 will drop the packet and an audit message will be generated. Such an occurrence might indicate a possible attack or it might simply be a symptom of an erroneous key entry in the Security Association Database.

Figure 2:
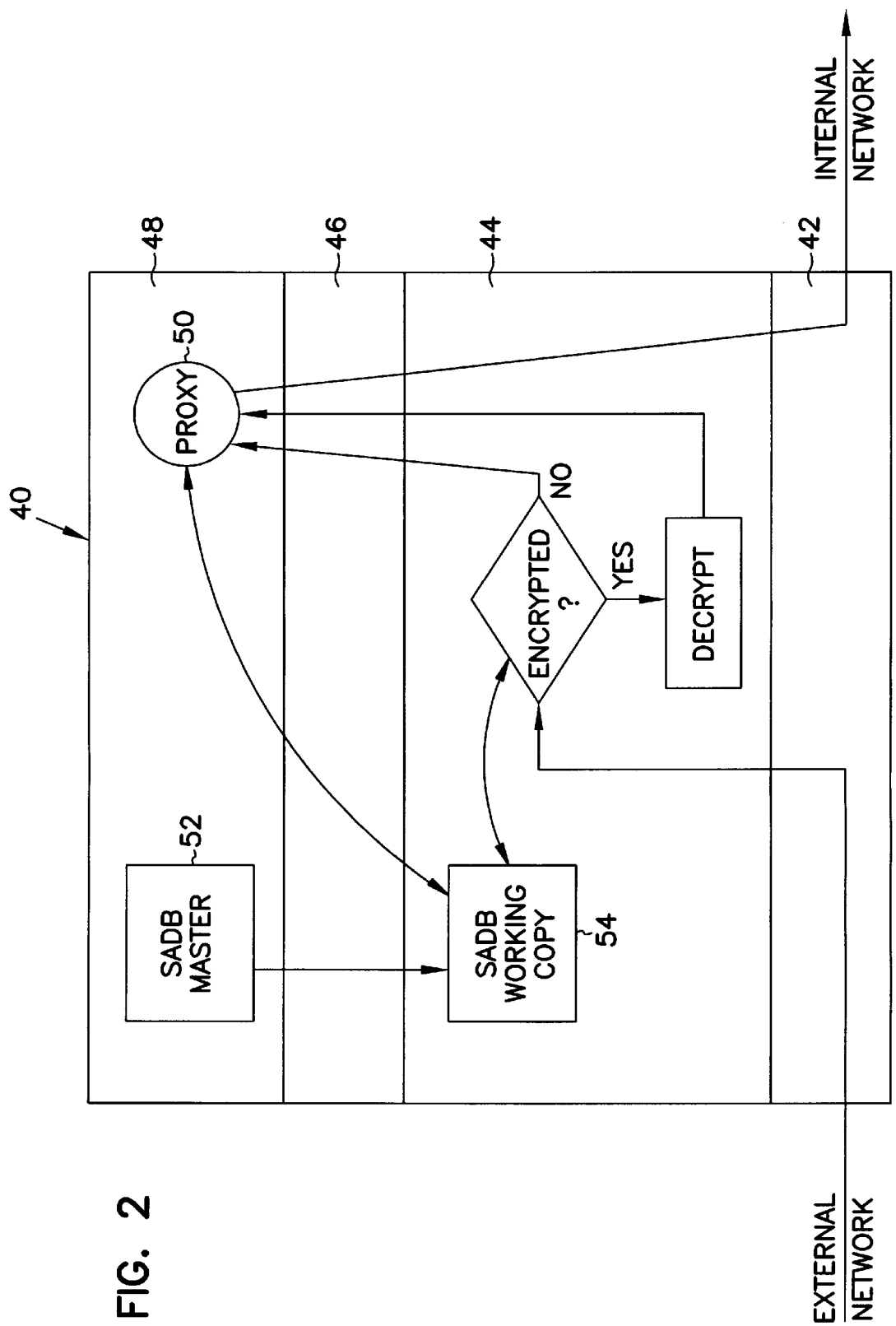
FIG. 2 is a block diagram showing access control checking of both encrypted and unencrypted messages in network protocol stack according to the present invention.

In a system such as system 10, application level gateway firewall 18 acts as a buffer between unprotected network 16 and workstations such as workstation 20. Messages coming from unprotected network 16 are reviewed and a determination is made as to whether execution of an authentication and identification protocol is warranted. In contrast to previous systems, system 10 also performs this same determination on IPSEC-encrypted messages. If desired, the same authentication and identification can be made on messages to be transferred from workstation 20 to unprotected network 16. FIG. 2 illustrates one way of authenticating both encrypted and unencrypted messages in a system such as system 10.

In the system of FIG. 2 a network protocol stack 40 includes a physical layer 42, an Internet protocol (IP) layer 44, a Transport layer 46 and an application layer 48. Such a protocol stack exists, for instance on application level gateway firewall 18 of FIG. 1. An application executing in application layer 48 can communicate to an application executing on another system by preparing a message and transmitting it through one of the existing transport services executing on transport layer 46. Transport layer 46 in turn uses a process executing in IP layer 44 to continue the transfer. Physical layer 42 provides the software needed to transfer data through the communication hardware (e.g., a network interface card or a modem). As noted above, IPSEC executes within IP layer 44. Encryption and authentication is transparent to the host as long as the network administrator has the Security Association Database correctly configured and a key management mechanism is in place on the firewall.

In application level gateway firewall 18, a proxy 50 operating within application layer 48 processes messages transferred between internal and external networks. All network-to-network traffic must pass through one of the proxies within application layer 48 before being the transfer across networks is allowed. A message arriving from external network 16 is examined at IP layer 44 and an SADB is queried to determine if the source address and SPI are associated with an SA. In the embodiment shown in FIG. 2, an SADB Master copy 52 is maintained in persistent memory at application layer 48 while a copy 54 of SADB is maintained in volatile memory within the kernel. If the message is supposed to be encrypted, the message is decrypted based on the algorithm and key associated with the particular SA and the message is transferred up through transport layer 46 to proxy 50. Proxy 50 examines the source and destination addresses and the type of service desired and decides whether authentication of the sender is warranted. If so, proxy 50 initiates an authentication protocol. The protocol may be as simple as requesting a user name and password or it may include a challenge/response authentication process. Proxy 50 also looks to see whether the message coming in was encrypted or not and may factor that into whether a particular type of authentication is needed. In Telnet, for instance, user name/password authentication may be sufficient for an FFE link while the security policy may dictate that a more stringent challenge/response protocol is needed for unencrypted links. In that case, proxy 50 will be a Telnet proxy and it will base its authentication protocol on whether the link was encrypted or not.

Since IPSEC executes within IP layer 44 there is no need for host firewalls to update their applications. Users that already have IPSEC available on their own host machine will, however, have to request that the firewall administrator set up SA's in the SADB for their traffic.

In the embodiment shown in FIG. 2, a working copy 54 of the Security Association Database consisting of all currently active SA's is kept resident in memory for ready access by IP layer processing as datagrams are received and transmitted. In addition, a working master copy 52 of the SADB is maintained in a file in nonvolatile memory. During system startup and initialization processing the content of all of the required SA's in master SADB 52 is added to the working copy 54 stored in kernel memory.

In one embodiment, firewall 18 maintains different levels of security on internal and external network interfaces. It is desirable for a firewall to have different levels of security on both the internal and external interfaces. In one embodiment, firewall 18 supports three different levels, numbered 0 through 2. These levels provide a simple policy mechanism that controls permission for both in-bound and out-bound packets.

Level 0—do not allow any in-bound or out-bound traffic unless there is a security association between the source and destination.

Level 1—Allow both in-bound and out-bound non-IPSEC traffic but force the use of IPSEC if a SA exists for the address. (To support this firewall 18 must look for a SA for each in-bound datagram.)

Level 2—allow NULL security associations to exist. NULL associations are just like normal security associations, except no encryption or authentication transform is performed on in-bound or out-bound packets that correspond to this NULL association. With Level 2 enabled, the machine will still receive unprotected traffic, but it will not transmit unless Level 1 is enabled.

The default protection level established when the Security Association Database (SADB) is initialized at boot time is 1 for in-bound traffic and 2 for out-bound traffic.

It is desirable for user-level daemons or proxies in firewall 18 to know whether or not a connection (or incoming UDP datagram in the case of a UDP proxy) is being encrypted or not. This information may be used, for example, to control access to services within internal network 19 or to determine the authentication method that will be used to authenticate the sender. One such method of controlling access to services within an internal network is described in GENERALIZED SECURITY POLICY MANAGEMENT SYSTEM AND METHOD, U.S. patent application Ser. No. 08/715,668, filed herewith, which description is hereby incorporated by reference. In addition, the above-mentioned patent disclosure teaches a method of selecting an authentication method based on whether a message was encrypted or not. That description also is hereby incorporated by reference. In the case of a Level 0 policy, it would be safe to assume that all incoming traffic is encrypted or authenticated. In the case of Levels 1 through 2, a determination must be made whether or not a security association exists for a given peer. Otherwise an application may believe that in-bound traffic has been authenticated when it really has not. (That is why it is necessary to look for an SA on input of each non-IPSEC datagram.)

In one embodiment, a flag which accompanies the message as it is sent from IP layer 44 to proxy 50 indicates whether the incoming message was or was not encrypted. In another embodiment, proxy 50 accesses Security Association Database 54 (the table in the kernel can be queried via an SADB routing socket (PF-SADB)) to determine whether or not a security association exists for a given peer. The SADB socket is much like a routing socket found in the stock BSD 4.4 kernel (protocol family PF-ROUTE) except that PF-SADB sockets are used to maintain the Security Association Database (SADB) instead of the routing table. Because the private keys used for encryption, decryption, and keyed authentication are stored in this table, access must be strictly prohibited and allowed to only administrators and key management daemons. Care must be taken when allowing user-level daemons access to /dev/mem or /dev/kmem as well, since the keys are stored in kernel memory and could be exposed with some creative hacking.

In one embodiment, a command-line tool called sadb is used to support the generation and maintenance of in-kernel version 54 of SADB. The primary interface between this tool and the SADB is the PF-SADB socket. The kernel provides socket processing to receive client requests to add, update, or change entries in in-kernel SADB 54. As noted above, the default protection level established when the Security Association Database (SADB) is initialized at boot time is 1 for in-bound traffic and 2 for out-bound traffic. This may be changed by the use of the sadb command.

The existing sadb command was derived from the NIST implementation of IPSEC. As noted above, this tool is much like route in that it uses a special socket to pass data structures in and out of the kernel. There are three commands recognized by the sadb command: get, set, delete. The following simple shell script supports adding and removing a single SA entry to SADB 54. It shows one embodiment of a parameter order for adding a SA to the SADB.

```
# ! /bin/sh
if [ $# -ne 1 ]
then
    echo "usage: $0 <on>|<off>" >&2
    exit 1
fi
ONOFF=$1
```

```
addsa ()
{
IPADDRESS=$2
PEERADDRESS=0.0.0.0
PREFIXLEN=0                  # Num of bits, 0 => full 32 bit match
LOCALADDRESS=0.0.0.0
REALADDRESS=0.0.0.0
PORT=0
PROTOCOL=0
UID=0
DESALG=1                     # I = DES-CBC
IVLEN=4                      # bytes
DESKEY=0b0b0b0b0b0b0b0b
DESKEYLEN=8                  # bytes
AHALG=1                      # 1 = MD5
AHKEY=303132333435363730313233334353637
AHKEYLEN=16                  # bytes
LOCAL_SPI=$1
PEER_SPI=$1
TUNNEL_MODE=0
AHRESULTLEN=4
COMBINED_MODE=1              # On output, 1 = ESP, then AH;
0 = AH, then ESP
DYNAMIC_FLAG=0
if [ "$ONOFF" = "on"
then
    ./sadb add dst $IPADDRESS $PREFIXLEN $LOCAL_SPI
$UID $PEERADDRESS $PEER_SPI $TUNNEL_MODE
$LOCALADDRESS $REALADDRESS $PROTOCOL $PORT
$DESALG $IVLEN $DESKEYLEN $DESKEY $DESKEYLEN
$DESKEY $AHALG $AHKEYLEN $AHKEY $AHKEYLEN $AHKEY
$AHRESULTLEN $COMBINED_MODE $DYNAMIC_FLAG
else
    ./sadb delete dst $IPADDRESS $LOCAL-SPI
fi
}
#   Get down to work:
addsa 500 172.17.128.115         # number6.sctc.com
```

The current status of in-kernel SADB 54 can be obtained with the sadb command. The get option allows dumping the entire SADB or a single entry. In one embodiment, the complete dump approach uses /dev/kmem to find the information. The information may be presented as follows:

```
# sadb get dst
Local-SPI Address-Family Destination-Addr Prefix_length
UID
    Peer-Address Peer-SPI Transport-Type
    Local-Address Real-Address
    Protocol Port
    ESP_Alg_ID ESP_IVEC_Length
        ESP_Enc_Key_length ESP_Enc_ESP_Key
        ESP_Dec_Key_length ESP_Dec_ESP_Key
    AH_Alg_ID AH_Data_Length
        AH_Gen_Key_Length AH_Gen_Key
        AH_Check_Key_Length AH_Check_Key
    Combined_Mode Dynamic_Flag
---------------------------------------------------------------
500 INET: number6.sctc.com 0 0
    0.0.0.0    500 Transport(0) 0
    0.0.0.0.0.0.0.0
    None None
    DES/CBC-RFC1829 (1) 4
        8 0b0b0b0b0b0b0b0b
        8 0b0b0b0b0b0b0b0b
    MD5-RFC1828 (1) 4
        16 303132333435363730313233334353637
        16 303132333435363730313233334353637
    ESP+AH(1) 0
501 INET: spokes.sctc.com 0 0
    0.0.0.0    501 Transport(0) 0
    0.0.0.0.0.0.0.0
    None None
    DES/CBC-RFC1829(1) 4
```

-continued

```
        8 0b0b0b0b0b0b0b0b
        8 0b0b0b0b0b0b0b0b
    MD5-RFC1828(1)4
        16 30313233343536373031323334353637
        16 30313233343536373031323334353637
    ESP+AH(1) 0
End of list.
```

When a new entry is added to in-kernel SADB 54, the add process first checks to see that no existing entry will match the values provided in the new entry. If no match is found then the entry is added to the end of the existing SADB list.

Figure 3:
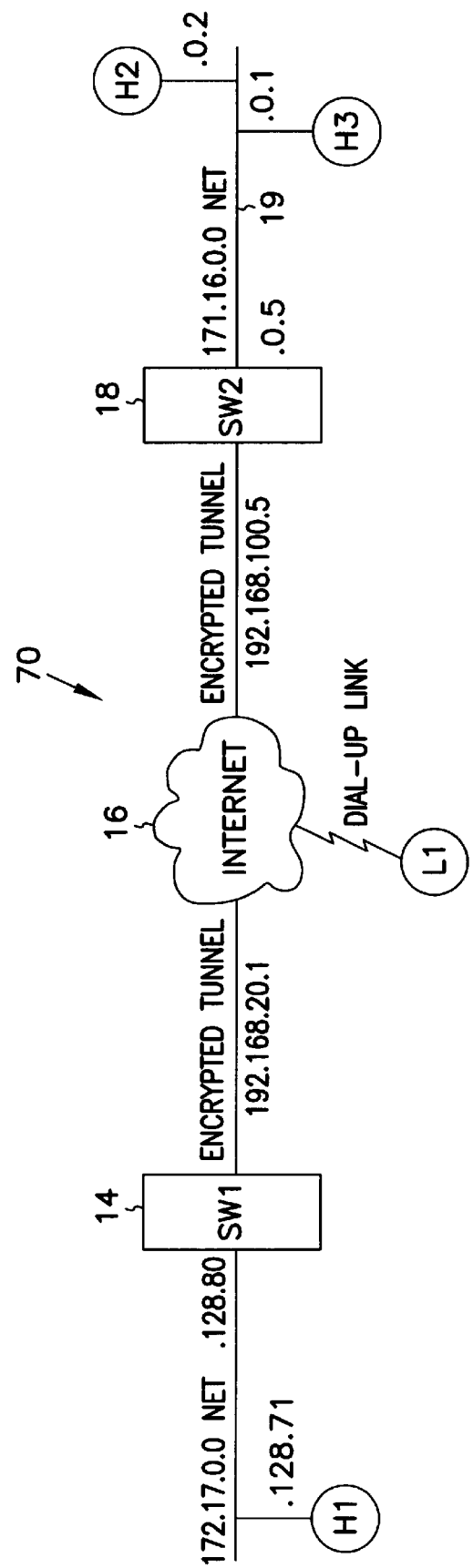
FIG. 3 is a block diagram of a representative application level gateway-implemented firewall-to-firewall encryption scheme.

To illustrate the use and administration of an FFE, we'll go through an example using FFE 70 in FIG. 3. Firewalls 14 and 18 are both application level gateway firewalls implemented according to the present invention. Workstations H2 and H3 both want to communicate with H1. For the administrator of firewalls 14 and 18, this is easy to accomplish. The administrator sets up a line something like this (we'll only show the IP address part and SPI parts of the SA, since they're the trickiest values to configure. Also, assume that we are using tunnel mode):

```
#   Hypothetical SW1 Config File

#   Fields are laid out in the following manner:
#   srcaddrornet= localSPI= peeraddr= peerSPI=
realsrcaddr= localaddr= key=
The following entry sets up a tunnel between hosts
behind SW1
# and hosts behind SW2.
src=172.16.0.0 localSPI=666 peer=192.168.100.5
peerSPI=777 \
        realsrcaddr=192.168.100.5 localaddrs=0.0.0.0
key=0xdeadbeeffadebabe
#   Hypothetical SW2 config File

#   Fields are laid out in the following manner:
#   srcaddrornet= localSPI= peeraddr= peerSPI=
        realsrcaddr= localaddr= key=
The following entry sets up a tunnel between hosts
behind SW1 and
#   hosts behind SW2.
src=172.17.0.0 localSPI=777 peer=192.168.20.1
peerSPI=666 \
        realsrcaddr=192.168.20.1 localaddr=0.0.0.0 \
        key=0xdeadbeeffadebabe
```

With this setup, all traffic is encrypted using one key, no matter who is talking to whom. For example, traffic from H2 to HI as well as traffic from H3 to H1 will be encrypted with one key. Although this setup is small and simple, it may not be enough.

What happens if H2 cannot trust H3? In this case, the administrator can set up security associations at the host level. In this case, we have to rely on the SPI field of the SA, since the receiving firewall cannot tell from the datagram header which host behind the sending firewall sent the packet. Since the SPI is stored in IPSEC datagrams, we can do a lookup to obtain its value. Below are the sample configuration files for both firewalls again, but this time, each host combination communicates with a different key. Moreover, H2 excludes H3 from communications with H1, and H3 excludes H2 in the same way.

```
#   Hypothetical SW1 Config File

#   Fields are laid out in the following manner:
#   srcaddrornet= localSPI= peeraddr= peerSPI=
realsrcaddr= localaddr= key=
# The following entry sets up a secure link between H2
and H1
src=172.16.0.2 localSPI=666 peer=192.168.100.5
peerSPI=777 \
        realsrcaddr=192.168.100.5 localaddrs=178.17.128.71
\
        key=0x0a0a0a0a0a0a0a0a
# The following entry sets up a secure link between H3
and H1
src=172.16.0.1 localSPI=555 peer=192.168.100.5
peerSPI=888 \
        realsrcaddr=192.168.100.5 localaddrs=178.17.128.71
\
        key=0x0b0b0b0b0b0b0b0b
#   Hypothetical SW2 Config File

#   Fields are laid out in the following manner:
#   srcaddrornet= localSPI= peeraddr= peerSPI=
realsrcaddr= localaddr= key=
# The following entry sets up a secure link between H2
and H1
src=172.17.128.71 localSPI=777 peer=192.168.20.1
peerSPI=666 \
        realsrcaddr=192.168.20.1 localaddrs=172.16.0.2 \
        key=0x0a0a0a0a0a0a0a0a
# The following entry sets up a secure link between H3
and H1
src=172.17.128.71 localSPI=888 peer=192.168.20.1
peerSPI=555 \
        realsrcaddr=192.168.20.1 localaddrs=172.16.0.1 \
        key=0x0b0b0b0b0b0b0b0b
```

Figure 4:
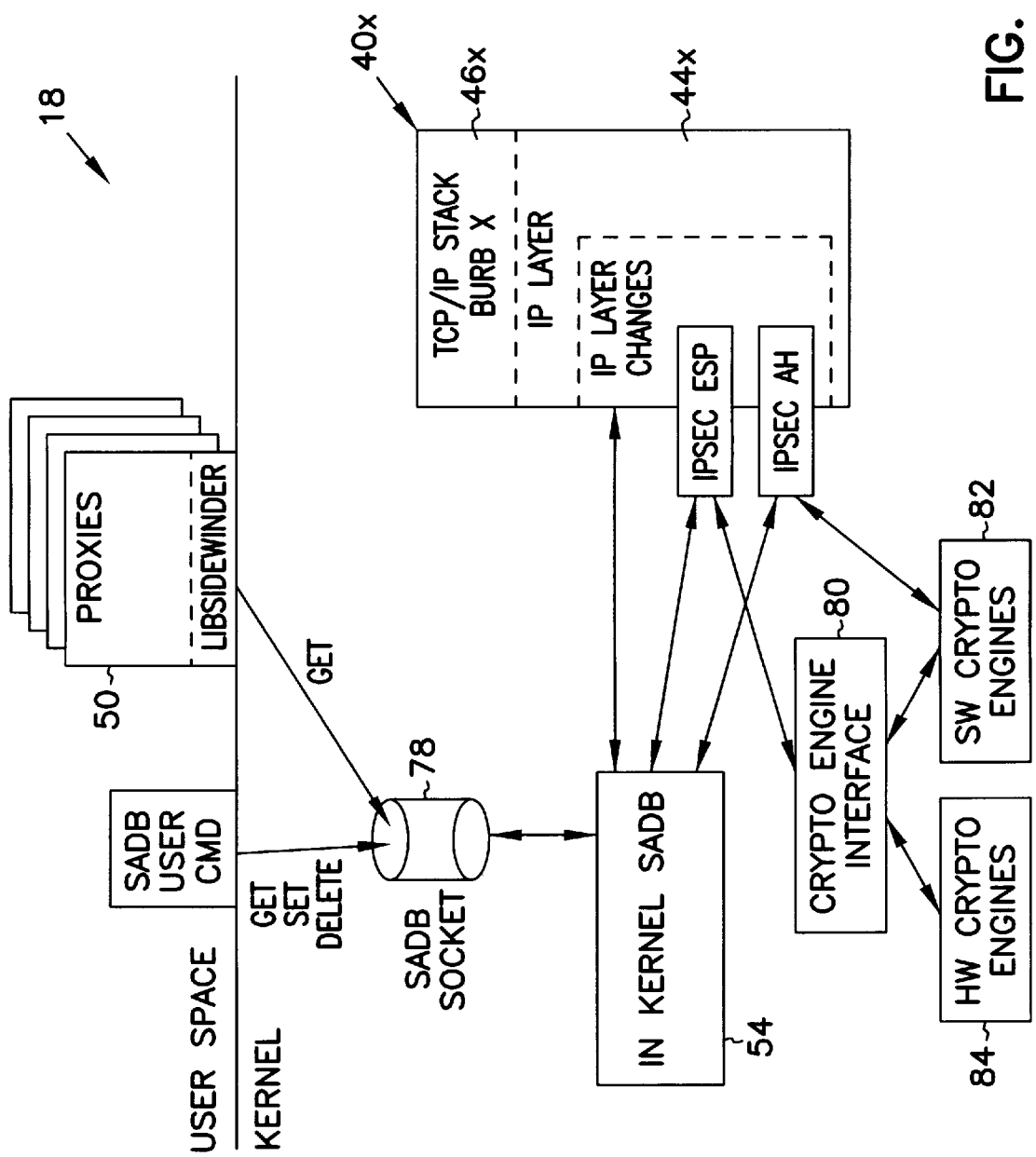
FIG. 4 is a block diagram of one embodiment of a network-separated protocol stack implementing IPSEC according to the present invention.

FIG. 4 is a block diagram showing in more detail one embodiment of an IPSEC-enabled application level gateway firewall 18. Application level gateway firewall 18 provides access control checking of both encrypted and unencrypted messages in a more secure environment due to its network-separated architecture. Network separation divides a system into a set of independent regions or burbs, with a domain and a protocol stack assigned to each burb. Each protocol stack 40x has its own independent set of data structures, including routing information and protocol information. A given socket will be bound to a single protocol stack at creation time and no data can pass between protocol stacks 40 without going through proxy space. A proxy 50 therefore acts as the go-between for transfers between domains. Because of this, a malicious attacker who gains control of one of the regions is prevented from being able to compromise processes executing in other regions. Network separation and its application to an application level gateway is described in "SYSTEM AND METHOD FOR ACHIEVING NETWORK SEPARATION", U.S. application Ser. No. 08/599,232, filed Feb. 9, 1996 by Gooderum et al., the description of which is hereby incorporated by reference.

In the system shown in FIG. 4, the in-bound and out-bound datagram processing of a security association continues to follow the conventions defined by the network separation model. Thus all datagrams received on or sent to a given burb remain in that burb once decrypted. In one such embodiment SADB socket 78 has been defined to have the type 'sadb'. Each proxy 50 that requires access to SADB socket 78 to execute its query as to whether the received message was encrypted must have create permission to the sadb type.

The following is list of specific requirements that a system such as is shown in FIG. 4 must provide. Many of the requirements were discussed in the information provided earlier in this document.

1. Firewall applications may query the IPSEC subsystem to determine if traffic with a given address is guaranteed to be encrypted.

2. Receipt of an unencrypted datagram from an address that has a SA results in the datagram being dropped and an audit message being generated.
3. On receipt of encrypted protocol datagrams the SADB searches will be done using the SPI as the primary key. The source address will a secondary key. The SA returned by the search will be the SA which matches the SPI exactly and has the longest match with the address.
4. A search of the SADB for a SPI that finds an entry that is marked as SA for a dynamic IP will not consider the address in the search process.
5. A search of the SADB for a SPI that finds an entry that is marked as a SA for a tunnel mode connection will to consider the address if it is (0.0.0.0) i.e INADDR.
6. On receipt of a non-IPSEC datagram the SADB will be searched for an entry that matches the src address. If a SA is found the datagram will be dropped and an audit message sent.
7. SADB searches on output will be done using the DST address as key. If more than one SA entry in the SADB has that address the first one with the maximum address match will be returned.
8. The SADB must be structured so that searches are fast regardless if the search is done by SPI or by address.
9. The SADB must provide support for connections to a site with a fixed SPI but changing IP address. SA entries for such connections will be referred to as Dynamic Address Sites, or just Dynamic entries.
10. When a dynamic entry is found by a SPI search, the current datagram's SRC address, which is required to ensure that the return datagrams are properly encrypted, will be recorded in the SA only after the AH checking has passed successfully. (This is because if the address is recorded before AH passes then an attacker can cause return packets of an outgoing connection to be transmitted in the clear.)
11. A failure of an AH check on a dynamic entry results in an audit message.
12. In an embodiment where the firewall requires that all connections use both AH and ESP, on receipt the order should be AH first ESP second.
13. The processing structure on both input and output should try to minimize the number of SADB required lookups.

Returning to FIG. 4, in one embodiment firewall 18 includes a crypto engine interface 80 used to encrypt an IPSEC payload. Crypto engine interface 80 may be connected to a software encryption engine 82 or to a hardware encryption engine 84. Engines 82 and 84 perform the actual encryption function using, for example, DES-CBC. In addition, software encryption engine 82 may include the keyed MD5 algorithm used for AH.

In one embodiment, crypto engine interface 80 is a utility which provides a consistent interface between the software and hardware encryption engines. As shown in FIG. 4, in one such embodiment interface 80 only supports the use of the use of hardware cryptographic engine 84 for IPSEC ESP processing. The significant design issue that interface 80 must deal with is that use of a hardware encryption engine requires that the processing be down in disjoint steps operating in different interrupt contexts as engine 84 completes the various processing steps.

The required information is stored in a request structure that is bound to the IP datagram being processed. The request is of type crypto_request_t. This structure is quite large and definitely does not contain a minimum state set.

In addition to the definition of the request data structure, this software implementing interface 80 provides two functions which isolate the decision of which cryptographic engine to use. The crypt_des_encrypt function is for use by the IP output processing to encrypt a datagram. The crypt_des_decrypt function is for use by the IP input processing to decrypt a datagram. If hardware encryption engine 84 is present and other hardware usage criteria are met the request is enqueued on a hardware processing queue and a return code indicating that the cryptographic processing is in progress is returned. If software engine 82 is used, the return code indicates that the cryptographic processing is complete. In the former case, the continuation of the IP processing is delayed until after hardware encryption is done. Otherwise it is completed as immediately in the same processing stream.

There are two software cryptographic engines 82 provided in the IPSEC software. One provides the MD5 algorithm used by the IPSEC AH processing, and the other provides the DES algorithm used by the IPSEC ESP processing. This software can be obtained from the U.S. Government IPSEC implementation.

In one embodiment hardware cryptographic engine 84 is provided by a Cylink SafeNode processing board. The interface to this hardware card is provided by the Cylink device driver. A significant aspect of the Cylink card that plays a major part in the design of the IPSEC Cylink driver is that the card functions much like a low level subroutine interface and requires software support to initiate each processing step. Thus to encrypt or decrypt an individual datagram there are a minimum of two steps, one to set the DES initialization vector and one to do the encryption. Since the IP processing can not suspend itself and wait while the hardware completes and then be rescheduled by the hardware interrupt handler, in one embodiment a finite state machine is used to tie sequences of hardware processing elements together. In one such embodiment the interrupt handler looks at the current state, executes a defined after state function, transitions to the state and then executes that state's start function.

One function, cyl_enqueue_request, is used to initiate either an encrypt or a decrypt action. This function is designed to be called by cryptographic engine interface 80. All of the information required to initiate the processing as well as the function to be performed after the encryption operation is completed is provided in the request structure. This function will enqueue the request on the hardware request queue and start the hardware processing if necessary.

Figure 5:
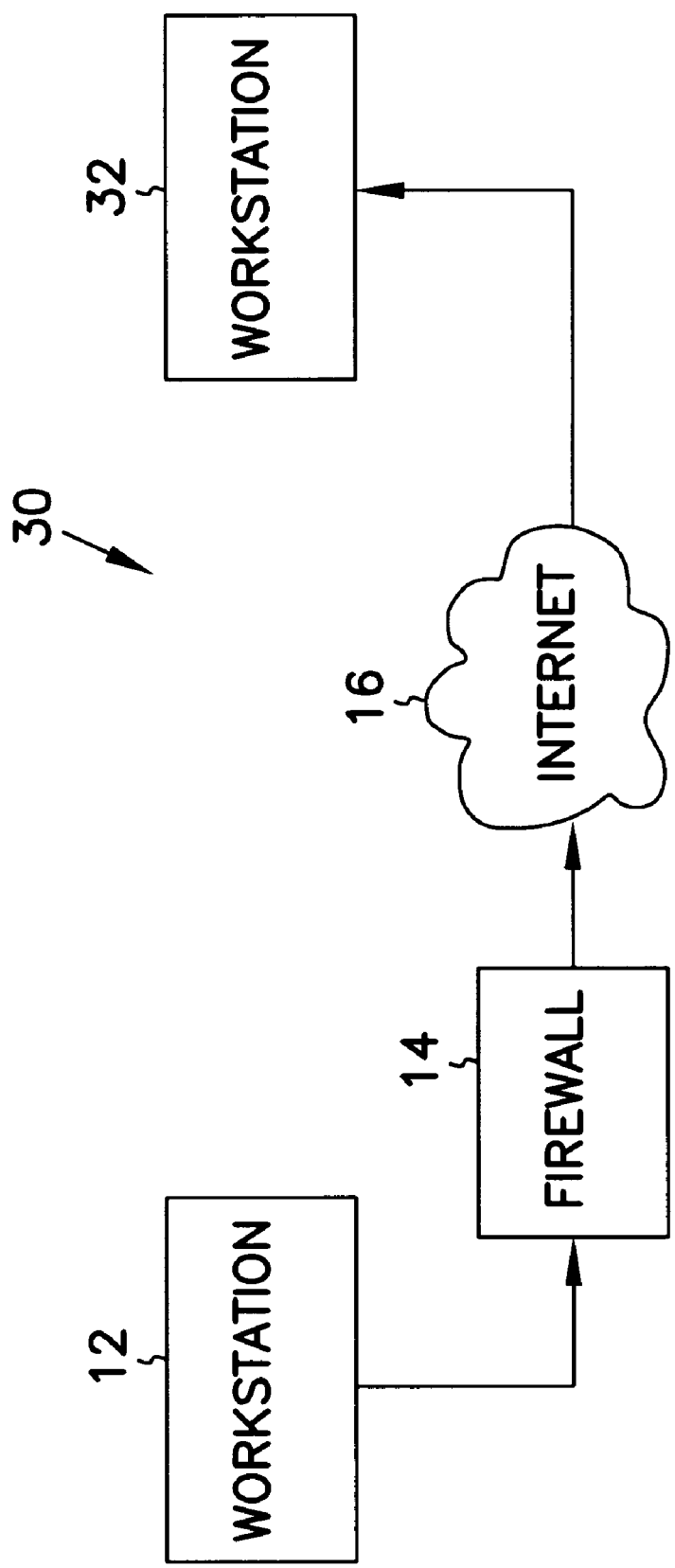
FIG. 5 is a functional block diagram of a firewall-to-workstation encryption scheme according to the present invention.

A system 30 which can be used for firewall-to-workstation encryption is shown in FIG. 5. In FIG. 5, system 30 includes a workstation 12 communicating through a firewall 14 to an unprotected network 16 such as the Internet. System 30 also includes a workstation 32 communicating directly with firewall 14 through unprotected network 16. Firewall 14 is an application level gateway incorporating IPSEC handling as described above. (It should be noted that IPSEC security cannot be used to authenticate the personal identity of the sender for a firewall to firewall transfer. When IPSEC is used, however, on a single user machine such as a portable personal computer, IPSEC usage should be protected with a personal identification number (PIN). In these cases IPSEC can be used to help with user identification to the firewall.)

According to the IPSEC RFC's, you can use either tunnel or transport mode with this embodiment based on your security needs. In certain situations, the communications must be sent in tunnel mode to hide unregistered addresses.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method of regulating the flow of messages between an external network and an internal network through a firewall having a network protocol stack, wherein the network protocol stack includes an Internet Protocol (IP) layer, the method comprising:

establishing a security policy;

determining, at the IP layer, if a message to an IP address is encrypted;

if the message to the IP address is not encrypted, passing the unencrypted message up the network protocol stack to an application level proxy;

if the message to the IP address is encrypted, decrypting the message and passing the decrypted message up the network protocol stack to the application level proxy, wherein decrypting the message includes executing a procedure at the IP layer to decrypt the message;

determining at the application level proxy and based on the security policy if the message to that IP address is one that can be forwarded, wherein the decision whether to forward is a function of whether the message was encrypted when received; and passing the message from the application level proxy to its destination through the IP layer.

2. A method of authenticating the sender of a message within a computer system having a network protocol stack, wherein the network protocol stack includes an Internet Protocol (IP) layer, the method comprising:

providing a plurality of authentication protocols, wherein each authentication protocol provides a different level of security;

determining, at the IP layer, if the message is encrypted;

if the message is encrypted, decrypting the message, wherein decrypting the message includes executing a process at the IP layer to decrypt the message;

passing the decrypted message up the network protocol stack to an application level proxy;

selecting an authentication protocol from the plurality of authentication protocols, wherein selecting includes determining an authentication protocol appropriate for the message, wherein the authentication protocol selected is a function of whether the message was encrypted when received;

executing, at the application level proxy, the authentication protocol to authenticate the sender of the message; and passing the decrypted message through the IP layer to its destination.

3. The method according to claim 2 wherein determining an authentication protocol appropriate for the message includes:

determining a source IP address associated with the message; and determining the authentication protocol associated with the source IP address.

4. A method of authenticating the sender of a message within a computer system having a network protocol stack, wherein the network protocol stack includes an Internet Protocol (IP) layer, the method comprising:

determining, at the IP layer, if the message is encrypted;

if the message is encrypted, decrypting the message, wherein decrypting the message includes executing a process at the IP layer to decrypt the message;

passing the decrypted message up the network protocol stack to an application level proxy;

determining an authentication protocol appropriate for the message wherein the message includes a security parameters index and wherein determining an authentication protocol appropriate for the message includes:

determining the authentication protocol associated with a dynamic IP address, wherein determining the authentication protocol includes looking up a security association based on the security parameters index;

determining a current address associated with the dynamic source IP address; and binding the current address to the security parameters index;

executing, at the application level proxy, the authentication protocol to authenticate the sender of the message; and passing the decrypted message through the IP layer to its destination.

5. The method according to claim 4 wherein the authentication protocol selected is a function of whether the message was encrypted when received.

6. A firewall, comprising:

a first communications interface;

a second communications interface;

a network protocol stack connected to the first and the second communications interfaces, wherein the network protocol stack includes an Internet Protocol (IP) layer and a transport layer;

a decryption procedure, operating at the IP layer, wherein the decryption procedure decrypts encrypted messages received at one of said first and second communications interfaces and outputs decrypted messages; and an application layer proxy, connected to the transport layer of said network protocol stack, wherein the application layer proxy includes a plurality of authentication protocols, wherein each authentication protocol provides a different level of security, wherein the application layer proxy receives decrypted messages from the decryption procedure, selects an authentication protocol from the plurality of authentication protocols as a function of content of the decrypted message and whether the message was encrypted when received, executes the selected authentication protocol, and returns the message to the IP layer.

7. A firewall, comprising:

a first communications interface;

a second communications interface;

a first network protocol stack connected to the first communications interface, wherein the first network protocol stack includes an Internet Protocol (IP) layer and a transport layer;

a second network protocol stack connected to the second communications interface, wherein the second network protocol stack includes an Internet Protocol (IP) layer and a transport layer;

a security policy;

a decryption procedure, operating at the IP layer of the first network protocol stack, the decryption procedure receiving encrypted messages received by said first communications interface and outputting decrypted messages; and an application layer proxy, connected to the transport layers of said first and second network protocol stacks, wherein the application layer proxy includes a plurality of authentication protocols, wherein each authentication protocol provides a different level of security, wherein the application layer proxy receives decrypted messages from the decryption procedure, selects an authentication protocol from the plurality of authentication protocols based on content of the decrypted message and whether the message was encrypted when received, and executes the selected authentication protocol; and wherein the application layer proxy determines based on the security policy whether the message is to be forwarded, and wherein the message is returned to the IP layer if the message is to be forwarded.

8. A firewall, comprising:

a first communications interface;

a second communications interface;

a first network protocol stack connected to the first communications interface, wherein the first network protocol stack includes an Internet Protocol (IP) layer and a transport layer;

a second network protocol stack connected to the second communications interface, wherein the second network protocol stack includes an Internet Protocol (IP) layer and a transport layer;

a security policy;

a decryption procedure, operating at the IP layer of the first network protocol stack, the decryption procedure receiving encrypted messages received by said first communications interface and outputting decrypted messages; and an application layer proxy, connected to the transport layers of said first and second network protocol stacks, wherein the application layer proxy includes a plurality of authentication protocols, wherein each authentication protocol provides a different level of security, wherein the application layer proxy receives decrypted messages from the decryption procedure, selects an authentication protocol from the plurality of authentication protocols based on the content of the decrypted message, and executes the selected authentication protocol and wherein the application layer proxy determines based on the security policy whether the message is to be forwarded, and wherein the message is returned to the IP layer if the message is to be forwarded;

a third communications interface; and a third network protocol stack connected to the third communications interface and to the application layer proxy, wherein the third network protocol stack includes an Internet Protocol (IP) layer and a transport layer and wherein the second and third network protocol stacks are restricted to first and second burbs, respectively.

9. The firewall according to claim 8 wherein the authentication protocol is also based on whether the message was encrypted when received.

10. A method of establishing a virtual private network between a first and a second network, wherein each network includes an application level gateway firewall which uses a proxy operating at the application layer to process traffic through the firewall, wherein each firewall includes a network protocol stack and wherein each network protocol stack includes an Internet Protocol (IP) layer, the method comprising:

providing a plurality of authenication protocols, wherein each authentication prtocol provides a different level of security;

transferring a connection request from the first network to the second network;

determining, at the IP layer of the network protocol stack of the second network's firewall, if the connection request is encrypted;

if the connection request is encrypted, decrypting the request, wherein decrypting the request includes executing a procedure at the IP layer of the second network's firewall to decrypt the message;

passing the connection request up the network protocol stack to an application level proxy;

selecting an authentication protocol from the plurality of authentication protocols, wherein selecting includes determining an authentication protocol appropriate for the connection request, wherein the authentication protocol selected is a function of whether the message was encrypted when received;

executing the authentication protocol at the application level proxy to authenticate the connection request; and if the connection request is authentic, establishing an active connection between the first and second networks and returning the connection request to the IP layer.

11. The method according to claim 10 wherein executing the authentication protocol includes executing program code within the firewall of the second network to mimic a challenge/response protocol executing on a server internal to the second network.

12. The method according to claim 10 wherein executing the authentication protocol includes executing program code to execute the authentication protocol in line to the session.

13. A computer-readable medium having computer-executable instructions for regulating the flow of messages between an external network and an internal network through a firewall having a network protocol stack, wherein the network protocol stack includes an Internet Protocol (IP), layer the instructions comprising:

instructions for establishing a security policy;

instructions for determining, at the IP layer, if a message to an IP address is encrypted;

instructions for passing the unencrypted message up the network protocol stack to an application level proxy if the message to the IP address is not encrypted;

instructions for decrypting the message and passing the decrypted message up the network protocol stack to the application level proxy if the message to the IP address is encrypted, wherein decrypting the message includes executing a procedure at the IP layer to decrypt the message;

instructions for determining at the application level proxy and based on the security policy if the message to that IP address is one that can be forwarded, wherein the decision whether to forward is a function of whether the message was encrypted when received; and instructions for passing the message from the application level proxy to its destination through the IP layer.

14. A computer-readable medium having computer-executable instructions for authenticating the sender of a message within a computer system having a network protocol stack, wherein the network protocol stack includes an Internet Protocol (IP) layer the instructions comprising:

instructions for providing a plurality of authentication protocols, wherein each authentication protocol provides a different level of security;

instructions for determining, at the IP layer, if the message is encrypted;

instructions for decrypting the message if the message is encrypted, wherein decrypting the message includes executing a process at the IP layer to decrypt the message;

instructions for passing the decrypted message up the network protocol stack to an application level proxy;

instructions for selecting an authentication protocol from the plurality of authentication protocols, wherein selecting includes determining an authentication protocol appropriate for the message, wherein the authentication protocol selected is a function of whether the message was encrypted when received;

instructions for executing, at the application level proxy, the authentication protocol to authenticate the sender of the message; and instructions for passing the decrypted message through the IP layer to its destination.

15. A computer-readable medium having computer-executable instructions for establishing a virtual private network between a first and a second network, wherein each network includes an application level gateway firewall which uses a proxy operating at the application layer to process traffic through the firewall, wherein each firewall includes a network protocol stack and wherein each network protocol stack includes an Internet Protocol (IP) layer, the instructions comprising:

instructions for providing a plurality of authentication protocols, wherein each authentication protocol provides a different level of security;

instructions for transferring a connection request from the first network to the second network;

instructions for determining, at the IP layer of the network protocol stack of the second network's firewall, if the connection request is encrypted;

instructions for decrypting the request if encrypted, wherein decrypting the request includes executing a procedure at the IP layer of the second network's firewall to decrypt the message;

instructions for passing the connection request up the network protocol stack to an application level proxy;

instructions for selecting an authentication protocol from the plurality of authentication protocols, wherein selecting includes determining an authentication protocol appropriate for the connection request, wherein the authentication protocol selected is a function of whether the message was encrypted when received;

instructions for executing the authentication protocol at the application level proxy to authenticate the connection request; and instructions for establishing, if the connection request is authentic, an active connection between the first and second networks and for returning the connection request to the IP layer.

16. A computer-readable medium having computer-executable instructions for authenticating the sender of a message within a computer system having a network protocol stack, wherein the network protocol stack includes an Internet Protocol (IP) layer, the instructions comprising:

instructions for determining, at the IP layer, if the message is encrypted;

instructions for decrypting the message if encrypted, wherein decrypting the message includes executing a process at the IP layer to decrypt the message;

instructions for passing the decrypted message up the network protocol stack to an application level proxy;

instructions for determining an authentication protocol appropriate for the message wherein the message includes a security parameters index and wherein determining an authentication protocol appropriate for the message includes:

determining the authentication protocol associated with a dynamic IP address, wherein determining the authentication protocol includes looking up a security association based on the security parameters index;

determining a current address associated with the dynamic source IP address; and binding the current address to the security parameters index;

instructions for executing, at the application level proxy, the authentication protocol to authenticate the sender of the message; and instructions for passing the decrypted message through the IP layer to its destination.

* * * * *